(12) United States Patent
Fridrich et al.

(10) Patent No.: US 6,831,991 B2
(45) Date of Patent: Dec. 14, 2004

(54) RELIABLE DETECTION OF LSB STEGANOGRAPHY IN COLOR AND GRAYSCALE IMAGES

(75) Inventors: Jessica Fridrich, Vestal, NY (US); Miroslav Goljan, Johnson City, NY (US)

(73) Assignee: The Research Foundation of SUNY State University Plaza, Albany, NJ (US)

( * ) Notice: Subject to any disclaimer, the term of this patent is extended or adjusted under 35 U.S.C. 154(b) by 688 days.

(21) Appl. No.: 09/887,805

(22) Filed: Jun. 22, 2001

(65) Prior Publication Data

US 2003/0026447 A1 Feb. 6, 2003

(51) Int. Cl.$^7$ .................................................. G60K 9/00
(52) U.S. Cl. .................................................... 382/100
(58) Field of Search ............................... 382/100, 166, 382/168, 171, 172, 232, 244

(56) References Cited

U.S. PATENT DOCUMENTS

| | | | |
|---|---|---|---|
| 5,613,004 A | * | 3/1997 | Cooperman et al. .......... 380/28 |
| 6,038,526 A | * | 3/2000 | Stein .......................... 702/191 |
| 6,064,764 A | * | 5/2000 | Bhaskaran et al. .......... 382/183 |

OTHER PUBLICATIONS

Practical invisibility in digital Communication, Tuomas Aura, Nov. 1995.
High Capacity Despite Better Steganalysis, Andreas Westfeld, Presented Sep. 28$^{th}$–Oct. 1, 1999.
Steganalysis of LSB Encoding in Color Images, Jessica Fridrich, Presented Jul. 31–Aug. 2, 2000.
Distortion–Free Data Embedding for Images, Miroslav Goljan, Presented Apr. 25–27$^{th}$, 2001.
Steganalysis Based on JPED Compatability—Jessica Fridrich, Presented Aug. 20–24, 2001.
Analysis of LSB Based Image Steganography Techniques, Presented Oct. 7–10, 2001.
Steganalysis of Images Created Using Current Steganography Software, Neil F. Johnson.
Exploring Steganography: Seeing the Unseen, Neil F. Johnson, 1998.
IEEE—MultiMedia, *Detecting LSB Steganography in Color and Gray–Scale Images*, 2001 IEEE.

* cited by examiner

*Primary Examiner*—Leo Boudreau
*Assistant Examiner*—Tom Y. Lu
(74) *Attorney, Agent, or Firm*—Christopher R. Pastel; Hancock & Estabrook, LLP

(57) ABSTRACT

A system and method that efficiently, accurately, and simply detect reliably least-significant-bit ("LSB") embedding of a secret message in randomly scattered pixels. The system and method apply to both 24-bit color images and 8-bit grayscale or color images. Many commercial steganographic programs use Least Significant Bit embedding (LSB) as the method of choice to hide messages in 24-bit, 8-bit color images and in grayscale images. They do so based on the common belief that changes to the LSBs of colors cannot be detected because of noise that is always present in digital images. By inspecting the differences in capacity for lossless (invertible) embedding in the LSB and the shifted LSB plane, the present invention reliably detects messages as short as 1% of the total number of pixels (assuming 1 bit per sample). The system and method of the present invention are fast, and they provide accurate estimates for the length of the embedded secret message.

20 Claims, 3 Drawing Sheets

RELIABLE DETECTION OF LSB STEGANOGRAPHY IN COLOR AND GRAYSCALE IMAGES

STATEMENT OF GOVERNMENT INTEREST

This invention was made with Government support under F30602-00-1-0521 and F49620-01-1-0123 from the U.S. Air Force. The Government has certain rights in the invention.

BACKGROUND OF THE INVENTION

This invention relates to steganography. Steganography is the art of secret communication, whose purpose is to hide the very presence of a communication. In particular this invention relates to the detection of hidden messages.

Steganography differs from cryptography, whose goal is to make communication unintelligible to those who do not posses the right keys. By means of steganography, digital images, videos, sound files, and other computer files that contain perceptually irrelevant or redundant information can be used as covers, that is, as carriers that hide secret messages embedded within. If one embeds a secret message into a cover-image, one obtains a "stego-image."

The stego-image cannot contain any detectable artifacts that result from embedding the secret message. If it does, a third party can use such artifacts to determine that a secret message lies within the stego-image. Once the third party can reliably detect the presence of the secret message, the steganographic tool becomes useless.

Images stored in the JPEG format make very poor cover images for steganographic methods that embed information in the spatial (pixel) domain. The quantization introduced by JPEG compression can serve as a "watermark" or unique fingerprint, and one can detect even very small modifications of the cover image by inspecting the compatibility of the stego-image with the JPEG format. (See J. Fridrich, M. Goljan, and R. Du, "Steganalysis based on JPEG compatibility", *SPIE Multimedia Systems and Applications IV,* Denver, Colo. (Aug. 20–24, 2001), to be presented).

Most steganographic programs use Least Significant Bit embedding ("LSB") as the method of choice to hide a message in 24-bit and 8-bit color images, and in grayscale images. They do so because it is generally believed that changes to the LSBs of colors cannot be detected. The noise that is always present in digital images is thought to mask such changes.

The present inventors have developed a steganographic method to detect LSB embedding in 24-bit color images. (See J. Fridrich, R. Du, and L. Meng, "Steganalysis of LSB Encoding in Color Images", *ICME* 2000, New York City, July 31–August 2, New York.) This RQP method is based on analyzing close pairs of colors created by LSB embedding. It works reasonably well as long as the number of unique colors in the cover image is less than 30% of the number of pixels. The size of the secret message can be estimated only very roughly. The results become progressively unreliable once the number of unique colors exceeds roughly 50% of the number of pixels, as happens frequently for high resolution raw scans and images taken with digital cameras stored in an uncompressed format. Another disadvantage of the RQP method is that it cannot be modified for grayscale images.

Westfeld and Pfitzmann ("Attacks on Steganographic Systems", *Proc. 3$^{rd}$ Info. Hiding Workshop,* Dresden, Germany, Sep. 28–Oct. 1, 1999, pp. 61–75) introduced a method based on statistical analysis of Pairs of Values (PoVs) that are exchanged during message embedding. These PoVs could be formed, for example, by pairs of colors that differ in the LSB only. This method provides very reliable results when the message's placement is known (e.g., when it is sequential). However, randomly scattered messages can only be reliably detected with this method when the message length becomes comparable with the number of pixels in the image.

Johnson and Jajodia ("Steganography: Seeing the Unseen." *IEEE Computer,* February 1998, pp.26–34; "Steganalysis of Images Created Using Current Steganography Software." *Proceedings of Workshop on Information Hiding,* Portland, Oreg., April 1998. Also published as *Notes in Computer Science,* vol. 1525, Springer-Verlag, 1998) pointed out that steganographic methods for palette images that preprocess the palette can be vulnerable. A number of steganographic programs create clusters of close palette colors that can be swapped for each other to embed message bits. This swapping can be done by decreasing the color depth and then expanding it to 256 by making small perturbations to the colors. This preprocessing creates suspicious pairs (clusters) of colors that can be easily detected. However, steganographic techniques that do not modify the palette (e.g., those that hide messages by embedding LSB into the pointers) cannot be detected by inspecting the palette itself.

Thus there is a need for reliable and accurate steganalytic techniques that can be applied to both 24-bit color images and to 8-bit grayscale or color images with randomly scattered message bits embedded in the LSBs of colors or pointers to the palette.

OBJECTS AND SUMMARY OF THE INVENTION

An object of the present invention is to provide an efficient, accurate, and simple method to reliably detect LSB embedding.

A further object of the present invention is to provide such a method to reliably detect LSB embedding in randomly scattered pixels.

Still a further object of the present invention is to provide such a method to reliably detect LSB embedding where the randomly scattered pixels are in both 24-bit color images and 8-bit grayscale or color images.

Briefly stated, the present invention provides a system and a method that efficiently, accurately, and simply detect reliably least-significant-bit ("LSB") embedding of a secret message in randomly scattered pixels. The system and method apply to both 24-bit color images and 8-bit grayscale or color images. Many commercial steganographic programs use Least Significant Bit embedding (LSB) as the method of choice to hide messages in 24-bit, 8-bit color images and in grayscale images. They do so based on the common belief that changes to the LSBs of colors cannot be detected because of noise that is always present in digital images. By inspecting the differences in capacity for lossless (invertible) embedding in the LSB and the shifted LSB plane, the present invention reliably detects messages as short as 1% of the total number of pixels (assuming 1 bit per sample). The system and method of the present invention are fast, and they provide accurate estimates for the length of the embedded secret message.

According to an embodiment of the invention, a method for detecting least significant bit ("LSB") embedding of a message hidden in randomly scattered samples of an alleged cover image comprises the steps of:

dividing the alleged cover image into a plurality of disjoint groups of adjacent samples; defining a discrimination function that assigns a real number to each member of the plurality, thereby capturing the smoothness of each of the groups; defining on the plurality at least one invertible operation that comprises a permutation of sample values, whereby values of the samples are invertibly perturbed by a small amount; applying the discrimination function and the flipping operation to define in the plurality three types of sample groups, (R)egular, (S)ingular, and (U)nusable, each of the types being defined for both positive and negative operations; plotting both positive and negative R and S for the alleged cover image on an RS diagram; constructing four curves of the RS diagram and calculating their intersections by extrapolation; and determining the existence or nonexistence of a secret message from the intersections.

According to a feature of the invention, apparatus for detecting least significant bit ("LSB") embedding of a message hidden in randomly scattered samples of an alleged cover image comprises means for dividing the alleged cover image into a plurality of disjoint groups of adjacent samples; first means for defining effective for defining a discrimination function that assigns a real number to each member of the plurality, thereby capturing the smoothness of each of the groups; second means for defining effective for defining on the plurality at least one invertible operation that comprises a permutation of sample values, whereby values of the samples are invertibly perturbed by a small amount; means for applying the discrimination function and the flipping operation to define in the plurality three types of sample groups, (R)egular, (S)ingular, and (U)nusable, each of the types being defined for both positive and negative operations; means for plotting both positive and negative R and S for the alleged cover image on an RS diagram; means for constructing four curves of the RS diagram; means for calculating the intersections of the four curves by extrapolation; and first means for determining effective for determining from the intersections the existence or nonexistence of a secret message.

According to another feature of the invention, a computer-readable storage medium embodies program instructions for a method for detecting least significant bit ("LSB") embedding of a message hidden in randomly scattered samples of an alleged cover image, the method comprising the steps of: dividing the alleged cover image into a plurality of disjoint groups of adjacent samples; defining a discrimination function that assigns a real number to each member of the plurality, thereby capturing the smoothness of each of the groups; defining on the plurality at least one invertible operation that comprises a permutation of sample values, whereby values of the samples are invertibly perturbed by a small amount; applying the discrimination function and the flipping operation to define in the plurality three types of sample groups, (R)egular, (S)ingular, and (U)nusable, each of the types being defined for both positive and negative operations; plotting both positive and negative R and S for the alleged cover image on an RS diagram; constructing four curves of the RS diagram and calculating their intersections by extrapolation; and determining the existence or nonexistence of a secret message from the intersections.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
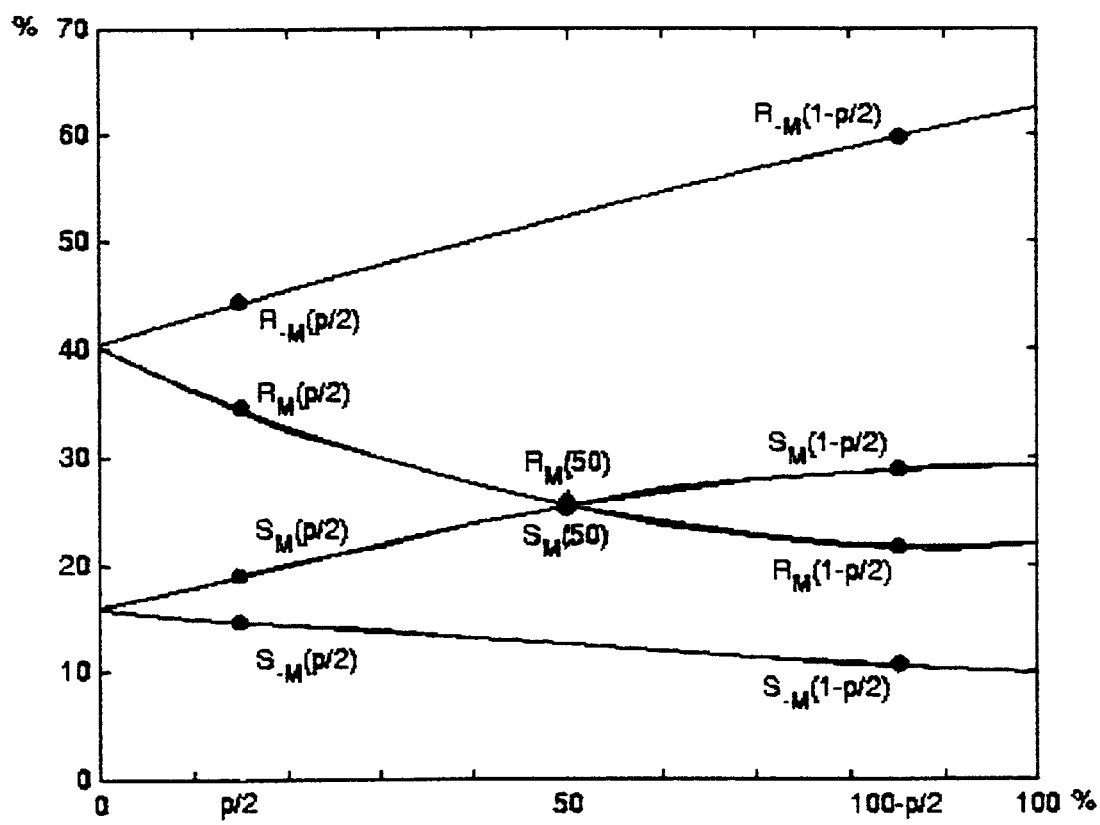
FIG. 1 is a diagram of an image taken by a digital camera in which the regular groups of pixels (R) and the singular groups (S) are plotted as functions of the number of flipped pixels.

In steganography, the less information embedded into the cover-image, the smaller the probability that embedding a secret image will introduce detectable artifacts. The selection of the cover-image, made by the person who sends the message, also determines how readily the existence of the secret message can be discovered. Images with a low number of colors, computer art, images with a unique semantic content, such as fonts—all should be avoided as cover images. Some steganographic experts suggest that grayscale images make the best cover-images (see T. Aura, "Invisible communication", In *Proc. of the HUT Seminar on Network Security* '95, Espoo, Finland, November 1995. Telecommunications Software and Multimedia Laboratory, Helsinki University of Technology [http://deadlock.hut.fi/ste/ste_html.html], [ftp://saturn.hut.fi/pub/aaura/ste1195.ps]).

Uncompressed scans of photographs, or images obtained with a digital camera, contain many colors. Thus they are usually considered safe for steganography. However, the present invention can reliably detect messages embedded in this class of images and accurately estimate the message length. The novel steganalytic technique of the present invention, which detects LSB embedding in color and grayscale images, originates in analyzing the capacity for lossless data embedding in the LSBs. For most images, the LSB plane is essentially random; it does not contain any easily recognizable structure. Thus classical statistical quantities constrained to the LSB plane cannot reliably capture the degree of randomization. Randomizing the LSBs decreases the lossless capacity in the LSB plane. It has a completely different influence on the capacity for embedding that is not constrained to one bit-plane. Thus the lossless capacity is a sensitive measure of the degree of randomization of the LSB plane.

The lossless capacity reflects the fact that the LSB plane, even though it looks random, is nevertheless related to the other bit-planes. This relationship, however, is not linear but nonlinear, and the lossless capacity measures this relationship. Thus it can be used to detect steganography.

To explain the new steganalytic technique, we begin with the main concepts of lossless embedding. Assume a cover image with M×N pixels and pixel values from the set P. For example, for an 8-bit grayscale image, P={0, ..., 255}. The lossless embedding starts with dividing the image into disjoint groups of n adjacent pixels $(x_1, \ldots, x_n)$. For example, we can choose groups of n=4 consecutive pixels in a row. We further define a discrimination function $f$ that assigns a real number $f(x_1, \ldots, x_n) \hat{I} R$ to each pixel group $G=(x_1, \ldots, x_n)$. The discrimination function captures the smoothness or "regularity" of the group of pixels G. The noisier the group of pixels $G=(x_1, \ldots, x_n)$, the larger the value of the discrimination function becomes. For example, we choose the 'variation' of the group of pixels $(x_1, \ldots, x_n)$ as the discrimination function $f$:

$$f(x_1, x_2, \ldots, x_n) = \sum_{i=1}^{n-1} |x_{i+1} - x_i| \qquad (1)$$

We can design other discrimination functions based on models of or statistical assumptions about the cover image.

Finally, we define an invertible operation F on P called "flipping". Flipping will be a permutation of gray levels that consists entirely of two-cycles. Thus, F will have the property that $F^2$=Identity or F(F(x))=x for all x∈P. The permutation $F_1$: 0<<1, 2<<3, . . . , 254<<255 corresponds to flipping (negating) the LSB of each gray level. We further define shifted LSB flipping $F_{-1}$ as −1<<0, 1<<2, 3<<4, . . . , 253<<254, 255<<256, or $$F_{-1}(x) = F_1(x+1) - 1 \text{ for all } x. \qquad (1a)$$

For completeness, we also define $F_0$ as the identity permutation F(x)=x for all x∈P. We use the discrimination function $f$ and the flipping operation F to define three types of pixel groups: R, S, and U:

Regular groups: G∈R ⇔ $f(F(G)) > f(G)$
Singular groups: G∈S ⇔ $f(F(G)) < f(G)$
Unusable groups: G∈U ⇔ $f(F(G)) = f(G)$.

In the expressions above, F(G) means that the flipping function F is applied to the components of the vector G=($x_1, \ldots, x_n$). We may wish to apply different flipping to different pixels in the group G. The assignment of flipping to pixels can be captured with a mask M, which is a n-tuple with values −1, 0, and 1. The flipped group F(G) is defined as ($F_{M(1)}(x_1), F_{M(2)}(x_2), \ldots, F_{M(n)}(x_n)$). The purpose of the flipping function F is to perturb the pixel values in an invertible way by some small amount, thereby simulating the act of invertibly adding noise. In typical pictures, adding a small amount of noise (i.e., flipping by a small amount) will lead to an increase rather than a decrease in the discrimination function. Thus, the total number of regular groups will be larger than the total number of singular groups. This bias allows for lossless imperceptible embedding of a potentially large amount of information (more details may be found in J. Fridrich, M. Goljan, and R. Du, "Distortion-free Data Embedding", 4th Information Hiding Workshop, Pittsburgh, Pa., Apr. 25–27, 2001).

We denote the number of regular groups for mask M as $R_M$ (in percents of all groups). Similarly, $S_M$ will denote the relative number of singular groups. We have $R_M + S_M \leq 1$ and $R_{-M} + S_{-M} \leq 1$, for the negative mask. The statistical hypothesis of our steganalytic technique is that, in a typical image, the expected value of $R_M$ is equal to that of $R_{-M}$, and the same is true for $S_M$ and $S_{-M}$:

$$R_M \cong R_{-M} \text{ and } S_M \cong S_{-M} \qquad (2)$$

This hypothesis can be justified heuristically by inspecting the expression (1). The flipping operation $F_{-1}$ is the same as applying $F_1$ to an image whose colors have been shifted by one. For a typical image, there is no a priori reason why the number of R and S groups should change significantly by shifting the colors by one.

Indeed, we have extensive experimental evidence, discussed below with reference to FIG. 2, that the hypothesis (2) holds very accurately for images taken with a digital camera for both lossy and lossless formats. It also holds well for images processed with common image processing operations and for most scanned images. The relationship (2), however, is violated if the LSB plane is randomized, for example, by LSB steganography.

FIG. 1 shows an RS-diagram of an image taken by a digital camera. The x-axis is the message length m, that is, the percentage of pixels with flipped LSBs. The y-axis is the relative number of regular and singular groups with masks M and −M, where M=[0 1 1 0].

Referring to FIG. 1, randomizing the LSB plane forces the difference between $R_M$ and $S_M$ to zero as the length m of the embedded message increases. After flipping the LSB of 50% of pixels (which is what would happen after embedding a random message bit into every pixel), we obtain $R_M \cong S_M$. This is equivalent to saying that the lossless embedding capacity in the LSB plane is zero (See Fridrich, Goljan, and Du, "Distortion-free Data Embedding). What is surprising is that randomizing the LSB plane has the opposite effect on $R_{-M}$ and $S_{-M}$. Their difference increases with the length m of the embedded message. The RS diagram of FIG. 1 shows $R_M$, $S_M$, $R_{-M}$, and $S_{-M}$ as functions of the number of pixels with flipped LSBs.

A simple explanation of the peculiar increase in the difference between $R_{-M}$ and $S_{-M}$ is given for the mask M=[0 1 1 0]. We define sets $C_i$={2i, 2i+1}, i=0, . . . , 127, and cliques of groups $C_{rst}$={G|G∈$C_r$'$C_s$'$C_t$}. There are $128^3$ cliques, each clique consisting of 8 groups (triples). The cliques are closed under LSB randomization. For the purpose of our analysis, we recognize four different types of cliques, ignoring those that are horizontally and vertically symmetrical. The table below shows the four types and the number of R, S, and U groups under $F_1$ and $F_{-1}$ for each type. From the table, one can see that, while randomizing LSBs tends to equalize the number of R and S groups in each clique under $F_1$, it increases the number of R groups and decreases the number of S groups under $F_{-1}$.

TABLE 1

| Clique type | $F_1$ flipping | $F_{-1}$ flipping |
| --- | --- | --- |
| r = s = t | 2R, 2S, 4U | 8R |
| r = s > t | 2R, 2S, 4U | 4R, 4U |
| r < s > t | 4R, 4S | 4R, 4S |
| r > s > t | 8U | 8U |

The new steganalytic technique of the present invention, which we call the RS technique, is to estimate the four curves of the RS diagram of FIG. 1 and calculate their intersection by extrapolation. The general shape of the four curves in the diagram varies with the cover-image from almost perfectly linear to curved. Our experiments show that the $R_{-M}$ and $S_{-M}$ curves are well-modeled with straight lines; the inner curves $R_M$ and $S_M$ can be reasonably well approximated with second degree polynomials.

The parameters of the curves can be determined from the points marked in FIG. 1. If we have a stego-image with a message of an unknown length p (in percent of pixels) embedded in the LSBs of randomly scattered pixels, our initial measurements of the number of R and S groups correspond to the points $R_M(p/2)$, $S_M(p/2)$, $R_{-M}(p/2)$, and $S_{-M}(p/2)$ (see FIG. 1). The factor of one half comes from the fact that, if the message is a random bit-stream, on average only one half of the pixels will be flipped. If we flip the LSBs of all pixels in the image and calculate the number of R and S groups, we will obtain the four points $R_M(1-p/2)$, $S_M(1-p/2)$, $R_{-M}(1-p/2)$, and $S_{-M}(1-p/2)$ (see FIG. 1). By randomizing the LSB plane of the stego-image, we will obtain the middle points $R_M(½)$ and $S_M(½)$. Because these two points depend on the particular randomization of the LSBs, we should repeat the process many times and estimate $R_M(½)$ and $S_M(½)$ from the statistical samples. We can fit straight lines through the points $R_{-M}(p/2)$ $R_{-M}(1-p/2)$ and $S_{-M}(p/2)$ $S_{-M}(1-p/2)$. The points $R_M(p/2)$, $R_M(½)$, $R_M(1-p/2)$, and $S_M(p/2)$, $S_M(½)$, $S_M(1-p/2)$ determine two parabolas. Each parabola and a corresponding line intersect to the left. The arithmetic average of the x coordinates of both intersections allows us to estimate the unknown message length p.

We can avoid the time-consuming statistical estimation of the middle points $R_M(½)$ and $S_M(½)$ and, at the same time, make the message length estimation much more elegant by making two additional assumptions: (1) The point of intersection of the curves $R_M$ and $R_{-M}$ has the same x coordinate as the point of intersection of the curves $S_M$ and $S_{-M}$. This is essentially a stronger version of the assumption embodied in equation 2 above. (2) The curves $R_M$ and $S_M$ intersect at m=50%, or $R_M(½)=S_M(½)$. This assumption is equivalent to setting the lossless embedding capacity for a randomized LSB plane at zero.

We have verified these assumptions experimentally for a large database of images with unprocessed raw BMPs, JPEGs, and processed BMP images. From them we derive a simple formula for the secret message length p. After rescaling the x axis so that p/2 becomes 0 and 100-p/2 becomes 1, the x-coordinate of the intersection point is a root of the following quadratic equation:

$$2(d_1+d_0)x^2+(d_{-0}-d_{-1}-d_1-3d_0)x+d_0-d_{-0}=0,$$

where $d_0=R_M(p/2)-S_M(p/2)$, $d_1=R_M(1-p/2)-S_M(1-p/2)$, $d_{-0}=R_{-M}(p/2)-S_{-M}(p/2)$, and $d_{-1}=R_{-M}(1-p/2)-S_{-M}(1-p/2)$.

The message length p is calculated from the root x whose absolute value is smaller, $$p=x/(x-½).$$

The straight lines are defined by the number of R and S groups at p/2 and 1-p/2, and the assumptions embodied in equations (1) and (2) above provide enough constraints to uniquely determine the parabolas and their intersections.

Figure 2:
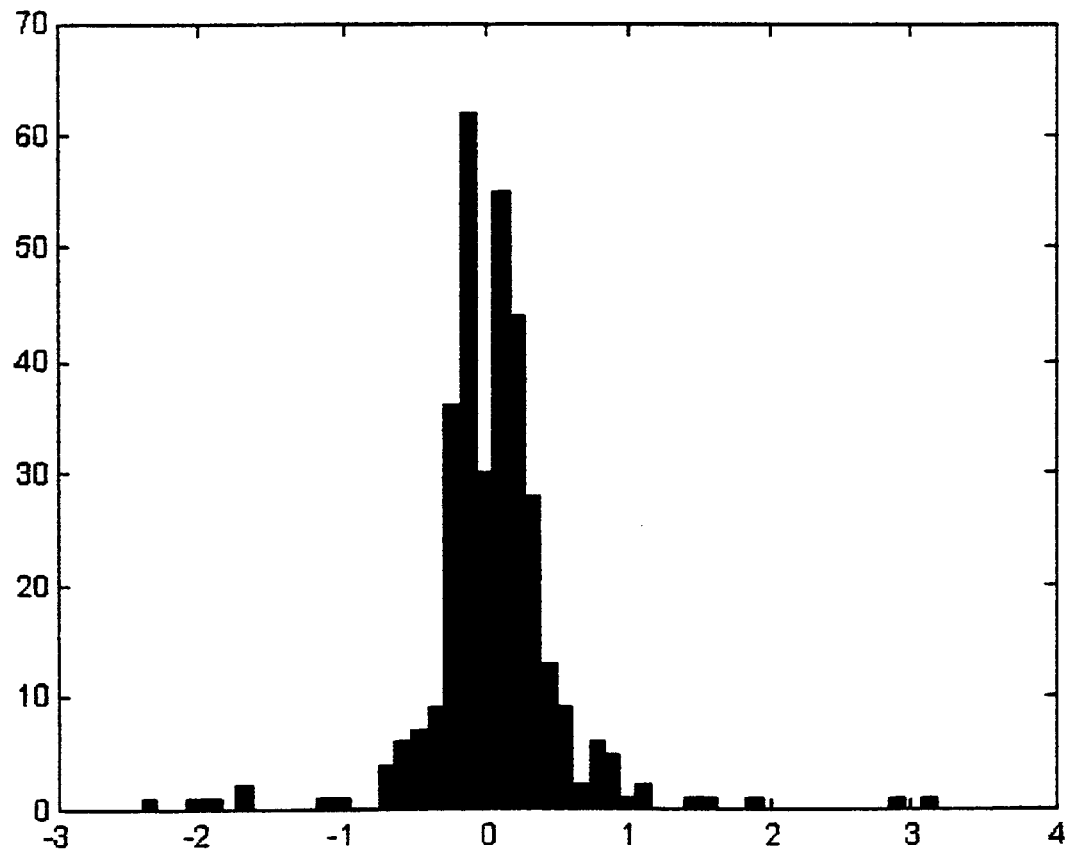
FIG. 2 is a histogram of the initial bias (in percent of the total number of pixels) in 331 original cover images, of size 250×350 pixels, stored in JPEG format.

Referring to FIG. 2, several factors influence the accuracy of the estimated message length. The first is initial bias. Random variations can cause a cover image that contains no hidden message to indicate a small message length. This initial non-zero bias could be both positive and negative, and it puts a limit on the theoretical accuracy of the steganalytic technique of the present invention. We have tested this initial bias for a database of 331 grayscale JPEG images, which yielded a Gaussian distribution with a standard deviation of 0.5%, as shown in FIG. 2. Smaller images tend to have higher variation in the initial bias because they have a smaller number of R and S groups. Scans of half-toned images and noisy images exhibit larger variations in the bias as well. On the other hand, the bias is typically very low for JPEG images, uncompressed images obtained by a digital camera, and high resolution scans. As another rule of thumb, we have found that color images exhibit larger variation in the initial bias than grayscale images.

If the initial message length $ml_0$ can be estimated using other means, the following formula can be used to correct the detected message length $ml_{det}$ $$ml = \frac{ml_{det} - ml_0}{1 - ml_0}$$

For very noisy images, the difference between the number of regular and singular pixels in the cover image is small. Consequently, the lines in the RS diagram intersect at a small angle and the accuracy of the RS Steganalysis of the present invention decreases.

The RS Steganalysis technique is more accurate for messages that are randomly scattered in the stego-image than for messages concentrated in a localized area of the image. To address this issue, one can apply the same algorithm to a sliding rectangular region of the image.

With a Kodak DC260 digital camera, we converted a color 1536×1024 image to grayscale and down-sampled to 384×256 pixels. A series of stego-images was created from the original image by randomizing the LSBs of 0–100% pixels in 5% increments. We detected the number of pixels with flipped LSBs in each stego-image using the steganalysis technique of the present invention and groups of 2×2 pixels with the mask [1 0; 0 1]. The error between the actual and estimated percentage of flipped pixels was almost always smaller than 1%.

Figure 3:
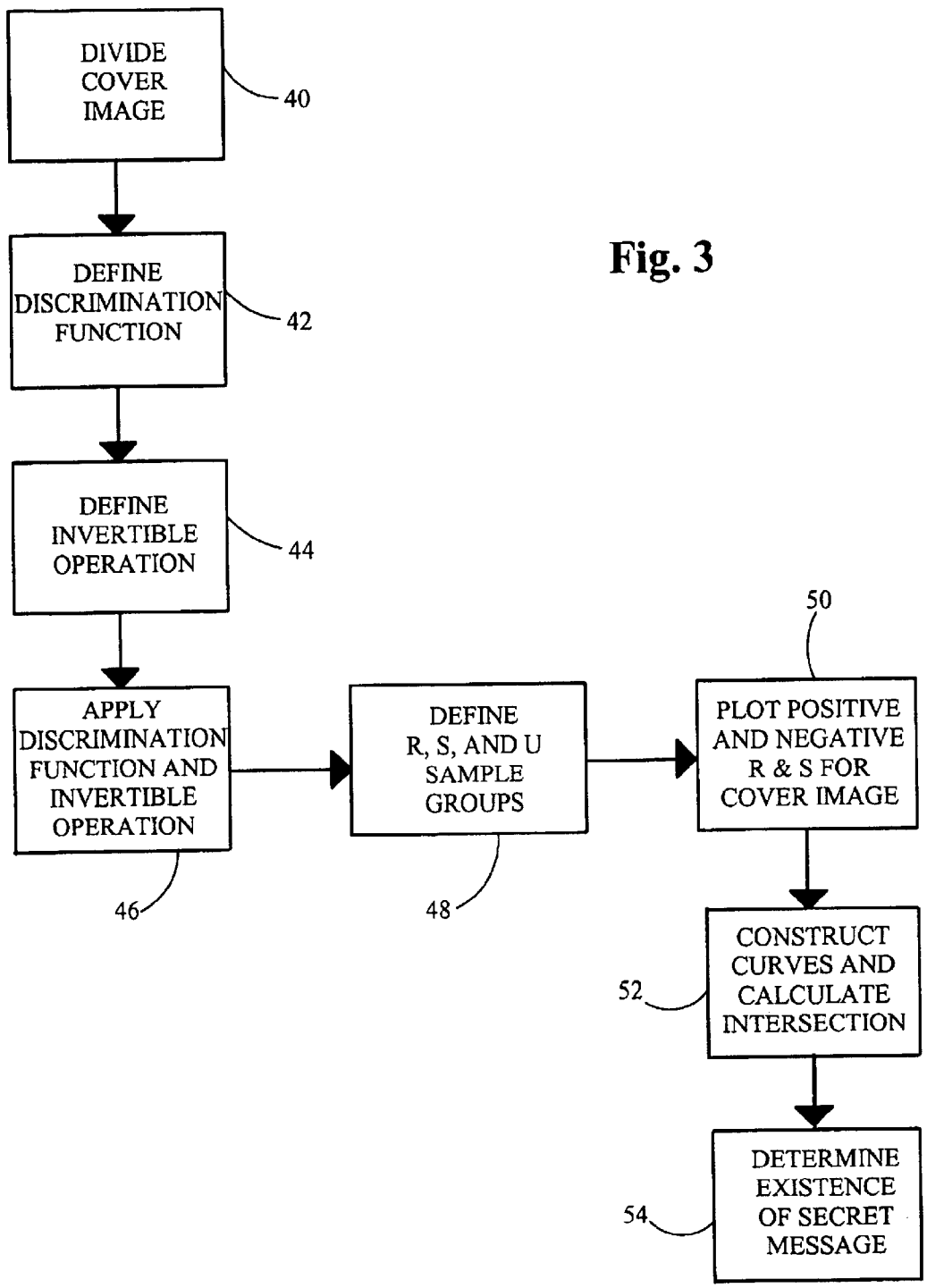
FIG. 3 is a flow diagram showing the steps of an embodiment of the invention.

Referring to FIG. 3, the method of the invention is shown. In step 40, the cover image is divided into a plurality of disjoint groups of adjacent samples. The in step 42, a discrimination function is defined that assigns a real number to each member of the disjoint groups, thereby capturing the smoothness of the groups. In step 44, at least one invertible operation is defined on the disjoint groups, with the invertible operation including a permutation of a sample values, whereby values of the samples are invertibly perturbed by a small amount. In step 46, the discrimination function and the invertible operation are applied to define in step 48 three types of sample groups in the disjoint groups, i.e., (R)egular, (S)ingular, and (U)nusable, with each of the types being defined for both positive and negative operations. In step 50, both positive and negative R and S are plotted for the alleged cover image on an RS diagram, after which four curves of the RS diagram are constructed and their intersections are calculated by extrapolation in step 52. Finally, in step 54, the existence or nonexistence of a secret message is determined from the intersections.

The RS Steganalysis technique of the present invention is applicable to most commercial steganographic software products. We have tested the RS steganalytic technique on a small sample of images, processed with different software products, and with different message sizes. In all cases, stego-images were readily distinguished from original cover images, and the estimated message length was within a few percent of the actual message length. We believe that our technique is equally applicable to GIFs with randomly scattered messages.

We tested the performance of the RS Steganalysis technique of the present invention on two images obtained from steganographic software products currently on the market. We used a relatively small image with a short message. The first test image was a scanned color photograph 422×296, and the message was a random bit sequence of length 375 kb, or 20% of the full capacity of the image (100%=3 bpp).

Since the initial bias is about 2.5% in each color channel (see Table 2), as indicated in the first row of the table, the expected detected percentage of flipped pixels would be about 12.5%. The actual numbers that should be detected in an ideal case (assuming zero bias) are indicated in parenthesis.

TABLE 2

Initial bias and estimated number of pixels with flipped LSBs for the first test image

|  | Red (%) | Green (%) | Blue (%) |
| --- | --- | --- | --- |
| Cover image | 2.5 (0.0) | 2.4 (0.0) | 2.6 (0.0) |
| Product #1 | 10.6 (9.8) | 13.3 (9.9) | 12.4 (9.8) |
| Product #2 | 13.4 (10.2) | 11.4 (10.2) | 10.3 (10.2) |
| Product #3 | 12.9 (10.0) | 13.8 (10.1) | 13.0 (10.0) |

For the second test image, we used a 24-bit color photograph originally stored in JPEG format, taken by the Kodak DC260 digital camera (original resolution 1536×1024) and cropped to 1024×744 pixels. In it we embedded a very short message of length 5% (100%=3 bpp). The results shown in Table 3 demonstrate the extraordinary accuracy of the RS Steganalysis of the present invention.

TABLE 3

Initial bias and estimated number of pixels with flipped LSBs for the second test image.

|  | Red (%) | Green (%) | Blue (%) |
| --- | --- | --- | --- |
| Cover image | 0.00 (0.00 | 0.17 (0.00) | 0.33 (0.00) |
| Product #1 | 2.41 (2.44) | 2.70 (2.46) | 2.78 (2.49) |
| Product #2 | 2.45 (2.45) | 2.62 (2.43) | 2.75 (2.44) |
| Product #3 | 2.44 (2.46) | 2.62 (2.46) | 2.85 (2.45) |

The novel technique of the present invention contradicts any rigorous attempt to detect Least Significant Bit steganography. See R. Chandramouli and N. Memon, "Analysis of LSB based Image Steganography Techniques" to be published in the Proceedings of ICIP 2001, Thessaloniki, Greece, Oct. 7–10, 2001. This paper introduces "the notion of steganographic capacity, that is, how many bits can we hide in a message without causing statistically significant modifications? Our results are able to provide an upper bound on the this capacity." Chandramouli and Memon determine that the upper bound for safe covert communication by LSB steganography is 44 bits per 64 pixels. In other words, they claim that a steganographic capacity of 44/64 bits per pixel (i.e., 0.6875 bits per pixel) or less is safe, because messages shorter than that upper bound cannot be detected.

The present invention, however, reliably detects messages shorter than 0.05 bits per pixel embedded in most cover images. For high quality images from a scanner or digital camera (the types most likely to be used for covert communication), even shorter messages (0.01 bits per pixel) can be reliably detected. Based on our experiments, we recommend a steganographic capacity of 0.005 bits per pixel as safe for LSB steganography, because our technique cannot reliably detect messages shorter than 0.005 bits per pixel. This upper bound is more than 100 times smaller than the bound found by Chandramouli and Memon. Thus, we can say that the present invention offers a 100-fold improvement over the prior art. The prior art therefore teaches away from the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for detecting least significant bit ("LSB") embedding of a message hidden in randomly scattered samples of an alleged cover image, comprising the steps of:
    dividing the alleged cover image into a plurality of disjoint groups of adjacent samples;
    defining a discrimination function that assigns a real number to each member of said plurality of disjoint groups, thereby capturing the smoothness of each of said groups;
    defining on said plurality of disjoint groups at least one invertible operation that comprises a permutation of sample values, whereby values of said samples are invertibly perturbed by a small amount;
    applying said discrimination function and said invertible operation to define in said plurality three types of sample groups, (R)egular, (S)ingular, and (U)nusable, each of said types being defined for both positive and negative operations;
    plotting both positive and negative R and S for said alleged cover image on an RS diagram;
    constructing four curves of said RS diagram and calculating their intersections by extrapolation; and
    determining the existence or nonexistence of a secret message from said intersections.

2. The method of claim 1, further including the step, if said secret message is determined to exist, of estimating a length thereof.

3. The method of claim 2, wherein each of said samples is a pixel value.

4. The method of claim 3, wherein said pixel value is a grayscale.

5. The method of claim 3, wherein said pixel value is a color.

6. The method of claim 2, wherein each of said samples is an index to a palette of color values.

7. The method of claim 1, wherein said step of constructing further comprises arithmetically averaging the x coordinates of said intersections, thereby detecting said hidden message, if it exists, and estimating a length thereof.

8. The method of claim 2, wherein said step of estimating further comprises determining a length p of said hidden message, if it exists, by rescalingthe x-axis of said RS diagram so that p/2 becomes 0 and 100–p/2 becomes 1, whereby an x-coordinate of an intersection is a root of the following quadratic equation:

$$2(d_1+d_0)x^2+(d_{-0}-d_{-1}-d_1-3d_0)x+d_0-d_{-0}=0,$$

where $d_0=R_M(p/2)-S_M(p/2)$, $d_1=R_M(1-p/2)-S_M(1-p/2)$, $d_{-0}=R_{-M}(p/2)-S_{-M}(p/2)$, $d_{-1}=R_{-M}(1-p/2)-S_{-M}(1-p/2)$, and said message length p is calculated from the root x whose absolute value is smaller, $$p=x/(x-½).$$

9. Apparatus for detecting least significant bit ("LSB") embedding of a message hidden in randomly scattered samples of an alleged cover image, which comprises:
    means for dividing said alleged cover image into a plurality of disjoint groups of adjacent samples;
    first means for defining effective for defining a discrimination function that assigns a real number to each member of said plurality of disjoint groups, thereby capturing the smoothness of each of said groups;
    second means for defining effective for defining on said plurality of disjoint groups at least one invertible operation that comprises a permutation of sample values, whereby values of said samples are invertibly perturbed by a small amount;

means for applying said discrimination function and said invertible operation to define in said plurality three types of sample groups, (R)egular, (S)ingular, and (U)nusable, each of said types being defined for both positive and negative operations;

means for plotting both positive and negative R and S for said alleged cover image on an RS diagram;

means for constructing four curves of said RS diagram;

means for calculating the intersections of said four curves by extrapolation; and first means for determining effective for determining from said intersections the existence or nonexistence of a secret message.

10. The apparatus of claim 9, further including means for estimating a length of said secret message if said secret message is determined to exist.

11. The apparatus of claim 10, wherein each of said samples is a pixel value.

12. The apparatus of claim 11, wherein said pixel value is a grayscale.

13. The apparatus of claim 11, wherein said pixel value is a color.

14. The apparatus of claim 10, wherein each of said samples is an index to a palette of color values.

15. The apparatus of claim 9, wherein said means for constructing and calculating is further effective for arithmetically averaging the x coordinates of said intersections, thereby detecting said hidden message and estimating a length thereof.

16. The apparatus of claim 10, wherein said means for estimating is effective for determining a length p of said hidden message by rescaling the x-axis of said RS diagram so that p/2 becomes 0 and 100−p/2 becomes 1, whereby an x-coordinate of an intersection is a root of the following quadratic equation:

$$2(d_1+d_0)x^2+(d_{-0}-d_{-1}-d_1-3d_0)x+d_0-d_{-0}=0,$$

where $d_0=R_M(p/2)-S_M(p/2)$, $d_1=R_M(1-p/2)-S_M(1-p/2)$, $d_{-0}=R_{-M}(p/2)-S_{-M}(p/2)$, $d_{-1}=R_{-M}(1-p/2)-S_{-M}(1-p/2)$, and said message length p is calculated from the root x whose absolute value is smaller, $$p=x/(x-½).$$

17. A computer-readable storage medium embodying program instructions for a method for detecting least significant bit ("LSB") embedding of a message hidden in randomly scattered samples of an alleged cover image, said method comprising the steps of:

dividing said alleged cover image into a plurality of disjoint groups of adjacent samples;

defining a discrimination function that assigns a real number to each member of said plurality of disjoint groups, thereby capturing the smoothness of each of said groups;

defining on said plurality of disjoint groups at least one invertible operation that comprises a permutation of sample values, whereby values of said samples are invertibly perturbed by a small amount;

applying said discrimination function and said invertible operation to define in said plurality three types of sample groups, (R)egular, (S)ingular, and (U)nusable, each of said types being defined for both positive and negative operations;

plotting both positive and negative R and S for said alleged cover image on an RS diagram;

constructing four curves of said RS diagram and calculating their intersections by extrapolation; and determining the existence or nonexistence of a secret message from said intersections.

18. The computer-readable storage medium of claim 17, said method further including the step, if said secret message is determined to exist, of estimating a length thereof.

19. The computer-readable storage medium of claim 17, said method further including, in said step of constructing, arithmetically averaging the x coordinates of said intersections, thereby detecting said hidden message, if it exists, and estimating a length thereof.

20. The computer-readable storage medium of claim 17, said method further including, in said step of estimating, determining a length p of said hidden message, if it exists, by rescalingthe x-axis of said RS diagram so that p/2 becomes 0 and 100−p/2 becomes 1, whereby an x-coordinate of an intersection is a root of the following quadratic equation:

$$2(d_1+d_0)x^2+(d_{-0}-d_{-1}-d_1-3d_0)x+d_0-d_{-0}0,$$

where $d_0=R_M(p/2)-S_M(p/2)$, $d_1=R_M(1-p/2)-S_M(1-p/2)$, $d_{-0}=R_{-M}(p/2)-S_{-M}(p/2)$, $d_{-1}=R_{-M}(1-p/2)-S_{-M}(1-p/2)$, and said message length p is calculated from the root x whose absolute value is smaller, $$p=x/(x-½).$$

* * * * *